(12) United States Patent
Tsai

(10) Patent No.: US 11,733,076 B2
(45) Date of Patent: Aug. 22, 2023

(54) AIRFLOW DETECTION DEVICE FOR DETECTING WHETHER AIR OUTPUT PATH IS OBSTRUCTED

(71) Applicant: Alpha Networks Inc., Hsinchu (TW)

(72) Inventor: Wei-Hung Tsai, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 31 days.

(21) Appl. No.: 17/500,826

(22) Filed: Oct. 13, 2021

(65) Prior Publication Data

US 2022/0326054 A1 Oct. 13, 2022

(30) Foreign Application Priority Data

Mar. 30, 2021 (TW) .................................. 110111586

(51) Int. Cl.
*G01F 1/11* (2006.01)
*G01F 15/14* (2006.01)
*G01F 15/06* (2022.01)

(52) U.S. Cl.
CPC ................ *G01F 1/11* (2013.01); *G01F 15/06* (2013.01); *G01F 15/14* (2013.01)

(58) Field of Classification Search
None
See application file for complete search history.

(56) References Cited

U.S. PATENT DOCUMENTS

| 4,931,776 A | * | 6/1990 | Klos | H01H 35/40 |
| | | | | 200/81.9 R |
| 5,136,882 A | * | 8/1992 | Wada | B08B 9/0328 |
| | | | | 73/198 |
| 5,767,419 A | * | 6/1998 | Hutchinson | G01F 1/24 |
| | | | | 73/861.74 |
| 9,547,974 B2 | * | 1/2017 | Wang | G01F 15/061 |

FOREIGN PATENT DOCUMENTS

| JP | S63-39676 U | | 3/1988 |
| JP | S6339676 | * | 3/1988 |
| JP | H02-24569 A | | 1/1990 |
| JP | H20-2008193781 A | | 8/2008 |

\* cited by examiner

*Primary Examiner* — Lisa M Caputo
*Assistant Examiner* — Nigel H Plumb
(74) *Attorney, Agent, or Firm* — CIPO IP Group

(57) ABSTRACT

An airflow detection device for detecting whether an air output path is obstructed can be mounted in the air output path and includes a carrying portion, a metallic sensing portion and a metallic air plate portion that are respectively positioned on the carrying portion and have different electrode polarities, so as to detect obstruction of the air output path. The airflow detection device can be applied to products located in remote areas, mountain areas, or other places where maintenance workers cannot inspect the products frequently for the state of their dust screens or ventilation holes, and can help warn of conditions such as ventilation hole obstruction to avoid product overheating due to dust or dirt accumulation on dust screens or ventilation hole obstruction, adverse impacts on product performance, service live or stability, or system crash.

16 Claims, 14 Drawing Sheets

AIRFLOW DETECTION DEVICE FOR DETECTING WHETHER AIR OUTPUT PATH IS OBSTRUCTED

CROSS-REFERENCE TO RELATED PATENT APPLICATION

This non-provisional application claims priority to and the benefit of, under 35 U.S.C. § 119(a), Taiwan Patent Application No. 110111586, filed in Taiwan on Mar. 30, 2021. The entire content of the above identified application is incorporated herein by reference.

FIELD

The present disclosure relates to an airflow detection device for detecting whether an air output path is obstructed, and more particularly to an airflow detection device that can be mounted in an air output path of an electrical device and includes a carrying portion, a metallic sensing portion and a metallic air plate portion that are respectively positioned on the carrying portion and have different electrode polarities, so that the metallic sensing portion and the metallic air plate portion can form a short-circuit state or an open-circuit state when in contact or not in contact with each other.

BACKGROUND

Today, people's activities are almost inseparable from electronic products. The invention of electronic products— be they smartphones, of which almost everyone has one; refrigerators, which are indispensable to each household; or desktop computers, which are extensively used for work— has brought about conveniences in people's daily lives. An electronic device, however, dissipates heat during high-performance operation. The heat must be removed, either through a built-in passive heat dissipation element that can dissipate heat efficiently, such as a heat sink or heat dissipation fins, or through an active heat dissipation element such as a heat dissipation fan, lest system performance be compromised by an accumulation of heat.

As is known in the art, a machine in operation generates heat, and a system fan is generally required to dissipate the heat generated and thereby reduce the heat building up in the machine. A system fan can discharge the hot air in a system so as to lower the temperature of the system. System fans are widely used for factory equipment, commercial buildings, datacenters, computers in offices, solar systems, clean-room equipment, inverters, refrigeration or freezing equipment, baking equipment, and other electronic products, and may be installed inside, or at a lateral side of, a system. The air output path of a system fan is generally provided with a dust screen or ventilation holes to prevent dust from entering the to-be-protected equipment or attaching to the vanes, and thus lowering the heat dissipation efficiency, of the fan.

As particulate matter carried by moving people or entrained by indoor-outdoor air circulation tends to accumulate over time on the surfaces of objects in the form of dust, the dust screen or ventilation holes in the air output path of a system fan are not spared the buildup of dust. Moreover, some electronic products are located in remote areas, mountain areas, or other places where maintenance workers cannot inspect the products frequently for the dirtiness of their dust screens, and some electronic products may have problem keeping their ventilation holes unobstructed. In either case, the products in question may become overheated during operation, and should that happen, the performances, service lives, or stability of the products will be adversely affected, if not causing a system crash. As the prior art provides no means for knowing if the air output path of an electronic product is obstructed, maintenance workers will not be alerted to deal with such obstruction, and an overly high product temperature resulting from such obstruction cannot be prevented. The issues to be addressed in the present disclosure include solving such problems effectively by enabling the detection of the obstruction of an air output path.

SUMMARY

In response to the aforesaid technical issues, as the result of extensive research and experiment, the present disclosure provides an airflow detection device for detecting whether an air output path is obstructed, so as to address the aforementioned issues.

One aspect of the present disclosure is directed to an airflow detection device that can detect obstruction in an air output path of an electrical device and be mounted in the air output path of the electrical device. The airflow detection device includes a carrying portion, a metallic sensing portion and a metallic air plate portion. The metallic sensing portion has a first electrode polarity and can be positioned on the carrying portion, and a metallic air plate portion having a second electrode polarity and can be positioned on the carrying portion, contact the metallic sensing portion to enter a short-circuit state in response to an airflow volume in the air output path meeting a first condition, and be out of contact with the metallic sensing portion to enter an open-circuit state in response to the airflow volume in the air output path meeting a second condition.

In certain embodiments, the first condition is the airflow volume being greater than a threshold value, and the second condition is the airflow volume being smaller than the threshold value.

In certain embodiments, the first condition is the airflow volume being smaller than a threshold value, and the second condition is the airflow volume being greater than the threshold value.

In certain embodiments, the carrying portion has a cavity, a portion of the metallic sensing portion can be received in the cavity, and a top end of the metallic sensing portion can be exposed from a top side of the carrying portion.

In certain embodiments, the carrying portion has a first main body formed with the cavity and provided with a first engaging unit, and a second main body provided with a second engaging unit that can engage with the first engaging unit. The top end of the metallic sensing portion can be exposed from the first main body, and a portion of the metallic air plate portion can be clamped by and located between the first main body and the second main body.

In certain embodiments, the metallic air plate portion has an air-plate engaging unit that can be engaged with the first engaging unit, and fix the metallic air plate portion to the first main body with a top end of the metallic air plate portion exposed from the first main body. The second engaging unit can be engaged with the first engaging unit and the air-plate engaging unit so that the metallic air plate portion is clamped between the first main body and the second main body.

In certain embodiments, the metallic air plate portion includes a deformation unit and an airflow engaging unit that is connected with the deformation unit and can apply a force to the deformation unit when being subjected to the airflow volume.

In certain embodiments, the metallic air plate portion induces a base unit and an airflow engaging unit that is connected with the base unit and can be pivotally connected to the carrying portion directly or indirectly and rotate in response to the airflow engaging unit being subjected to the airflow volume meeting the first condition or the second condition.

In certain embodiments, the base unit includes a rotating shaft member and a positioning member having a bottom side that can lie compliantly against a top side of the carrying portion, at front end provided with an air plate pin, and a rear side that can be connected with the rotating shaft member. The airflow engaging not is pivotally arranged on the rotating shaft member to be pivotally connected to the carrying portion indirectly.

In certain embodiments, the carrying portion includes a first main body and a second main body, the metallic air plate portion includes an airflow engaging unit and a contact unit, a bottom portion of the contact unit and a bottom portion of the metallic sensing portion can be disposed at two opposite sides of the first main body respectively, a top portion of the contact unit and a top portion of the metallic sensing portion can be disposed at two opposite sides of the second main body respectively, the airflow engaging unit can be pivotally connected to the second main body, and a width of the airflow engaging unit is greater than a distance between the contact unit and the metallic sensing portion.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
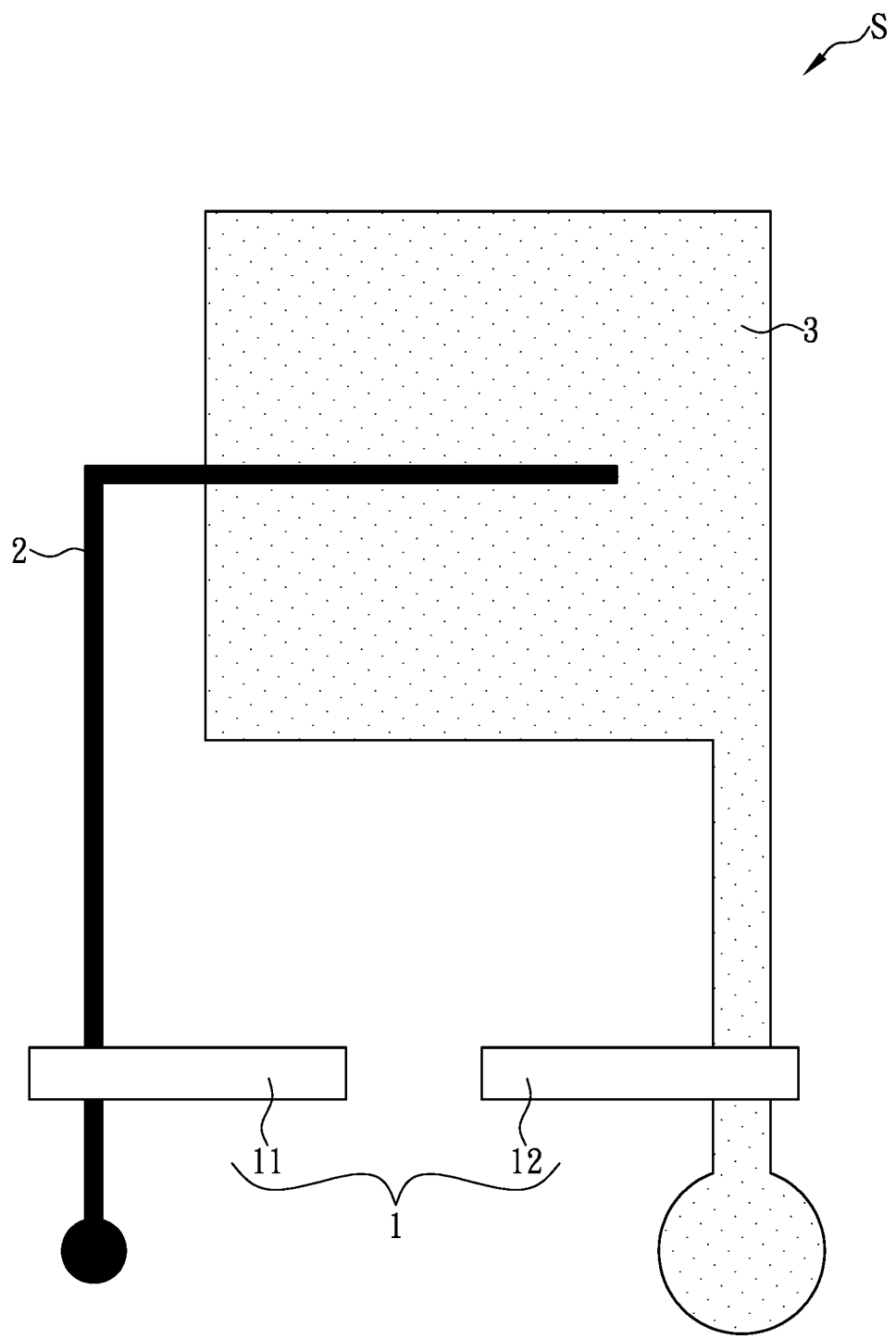
FIG. 1 is a front view of an airflow detection device according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless, the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

Figure 2:
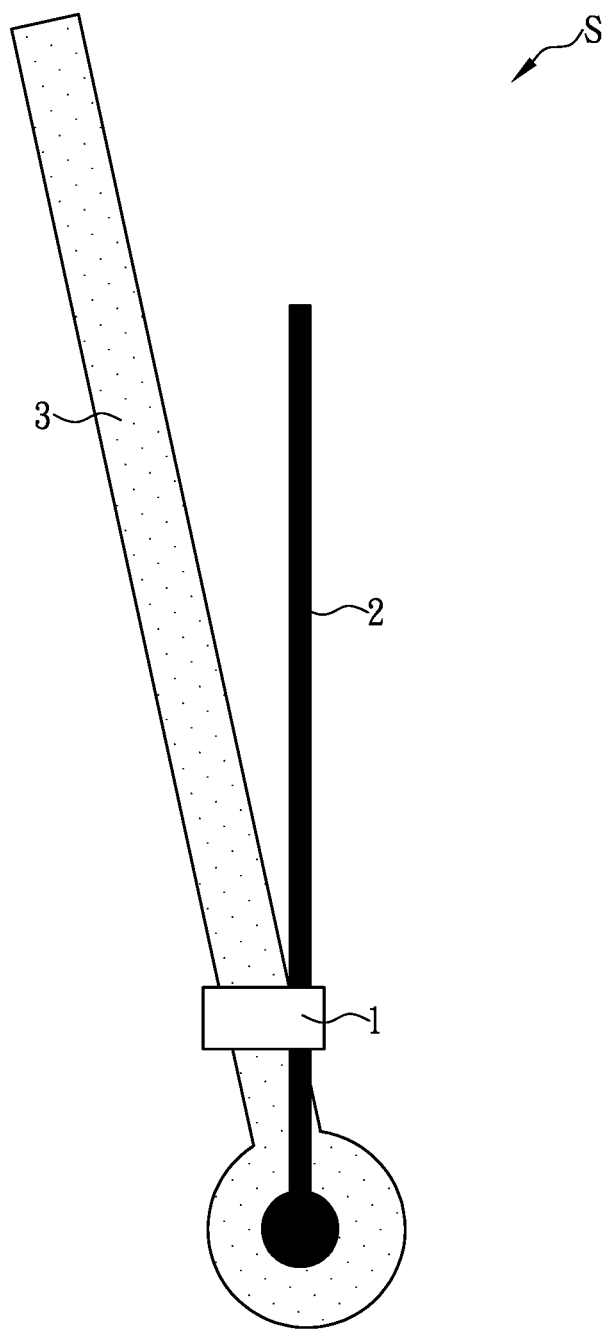
FIG. 2 is a side view of the airflow detection device according to certain embodiments of the present disclosure.

Referring to FIG. 1 and FIG. 2, the present disclosure provides an airflow detection device for detecting whether an air output path is obstructed, which can be disposed in the air output path of a piece of electronic equipment. For example, the fan of a server can blow out the hot air in the server when in operation to dissipate heat, and all the areas through which the hot air flows constitute the air output path referred to herein. In cases where a dust screen exists in the air output path, the airflow detection device S can be disposed in the air output path at a position downstream of the dust screen.

With continued reference to FIG. 1 and FIG. 2, the airflow detection device S includes a carrying portion 1, a metallic sensing portion 2, and a metallic air plate portion 3. The carrying portion 1 can be made of an insulating material (e.g., plastic). The metallic sensing portion 2 and the metallic air plate portion 3 can be provided on the carrying portion 1 respectively, and each can be made of an electrically conductive material. The metallic sensing portion 2 has a first electrode polarity (e.g., positive polarity), and the first metallic air plate portion 3 has a second electrode polarity (e.g., negative polarity). When the airflow in the air output path meets a first condition, the metallic air plate portion 3 is pressed against the metallic sensing portion 2 and thus brings the airflow detection device S into short-circuit state. When the airflow in the air output path meets a second condition, the metallic air plate portion 3 is not pressed against the metallic sensing portion 2 (as shown in FIG. 2), and the airflow detection device S is in an open-circuit state. A maintenance worker, therefore, only has to detect the state of the airflow detection device S (e.g., the short-circuit state or the open-circuit state) in order to know whether the airflow in the air output path meets the first condition or the second condition, and hence whether the air output path is obstructed by foreign matter. The airflow detection devices S of different structures as described infra are for illustrative purpose only, and an airflow detection device S according to the present disclosure is not limited thereto or to the configuration depicted in FIG. 1. A manufacturer can adjust the shape of each element according to product requirements, and any airflow detection device S that has the basic structure and function as described in the present disclosure shall be viewed as falling within the scope of the present disclosure.

The elements and working mechanism of the airflow detection device S are detailed infra with reference to certain exemplary embodiments. In certain embodiments, referring to FIG. 3 and FIG. 4 the airflow detection device S including the carrying portion 1, the metallic sensing portion 2 and the metallic air plate portion 3 is described with the following definitions. To facilitate description of the relative positions of the various elements, the front side of each element is defined as facing the lower left corner of FIG. 3, the rear side as facing the upper right corner of FIG. 3, the left side as facing the upper left corner of FIG. 3, the right side as facing the lower right corner of FIG. 3, an upper side (e.g., the top side) as facing the top edge of FIG. 3, and a lower side (e.g., the bottom side) as facing the bottom edge of FIG. 3.

Figure 3:
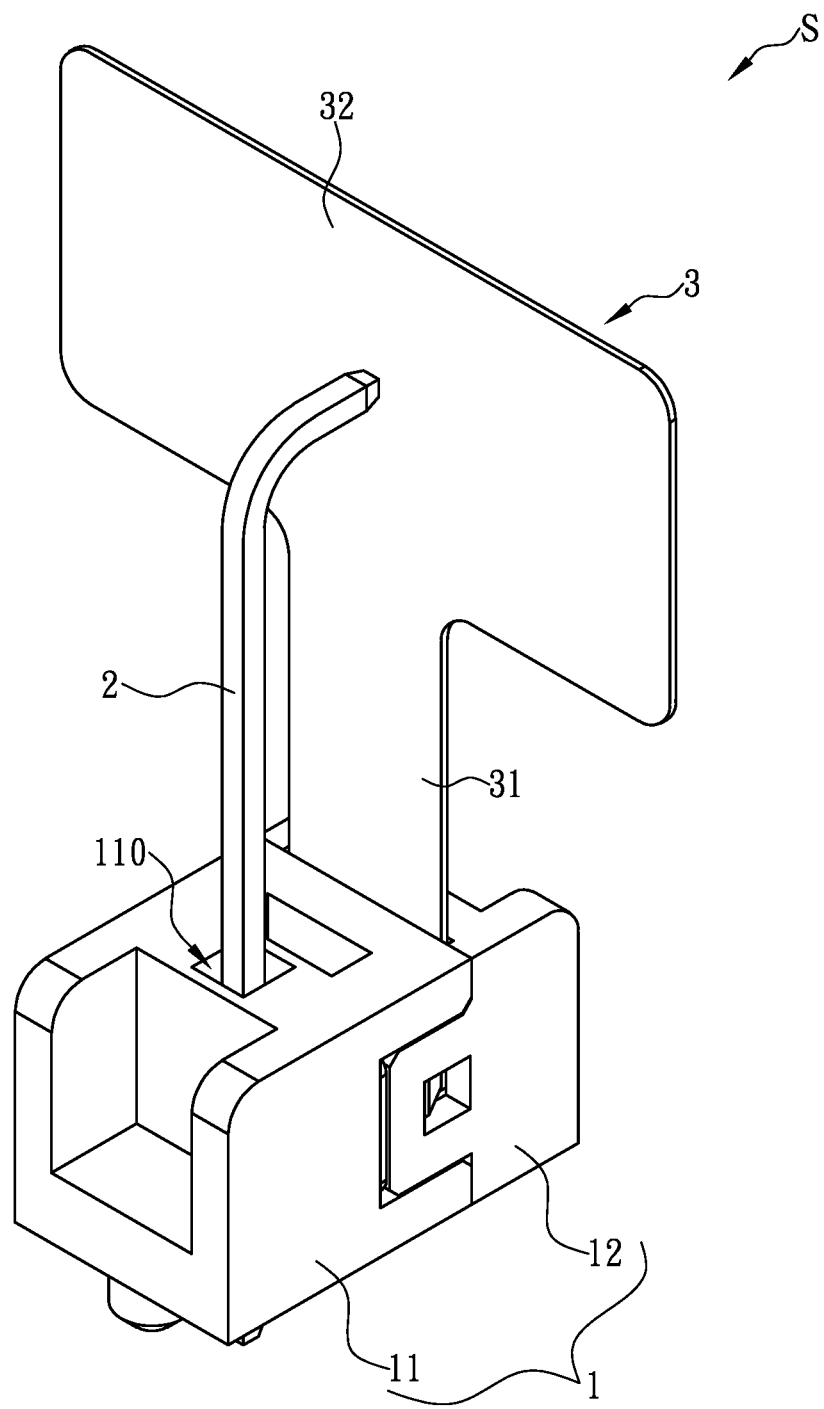
FIG. 3 is a perspective view of the airflow detection device according to certain embodiments of the present disclosure.
Figure 4:
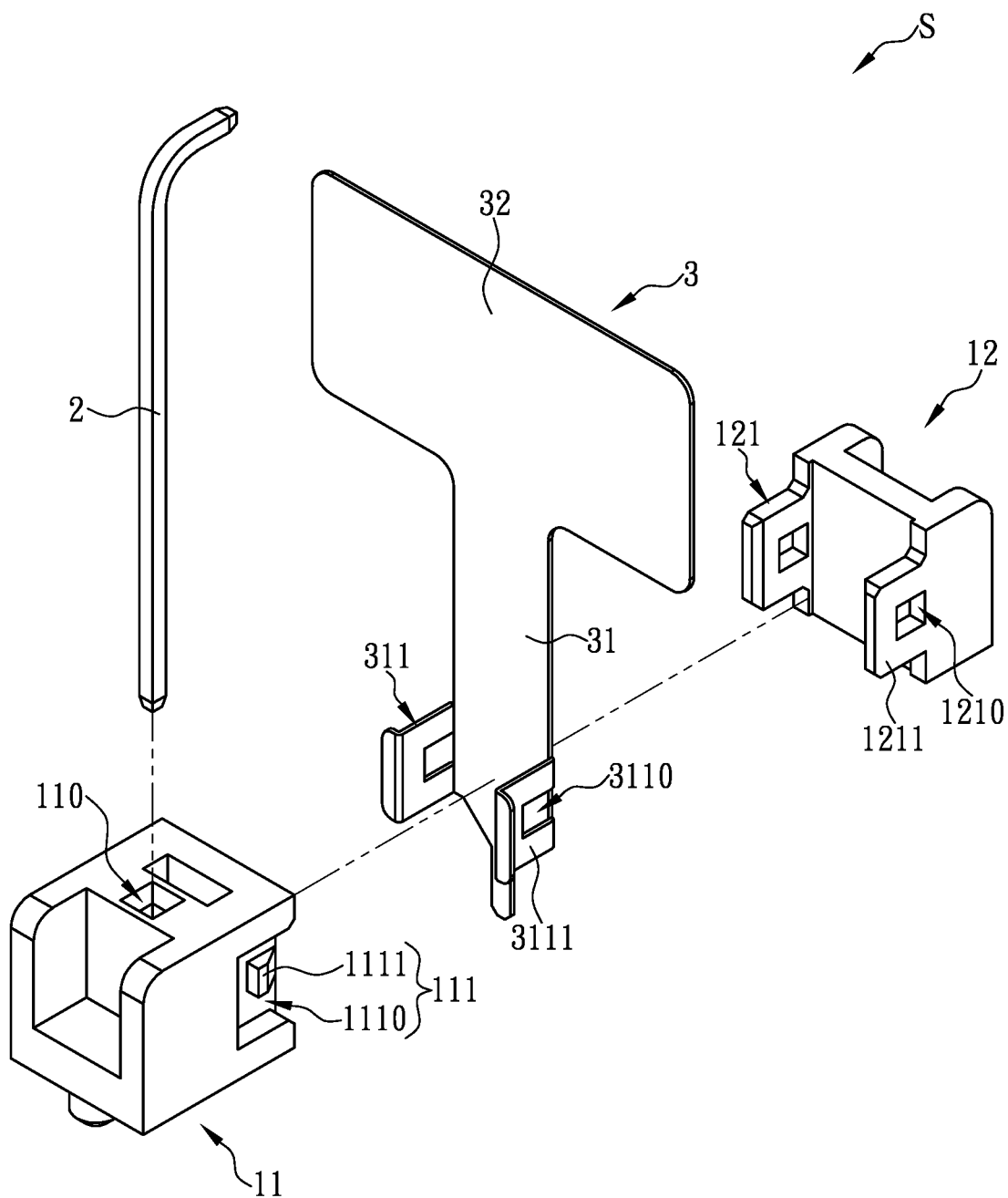
FIG. 4 is an exploded view of the airflow detection device according to certain embodiments of the present disclosure.

In certain embodiments, with continued reference to FIG. 3 and FIG. 4, the carrying portion 1 can be made of a plastic material and includes a first main body 11 and a second main body 12. The first main body 11 has a central portion vertically penetrated by a cavity 110. The left and right sides of the first main body 11 are each provided with a first engaging unit 111 adjacent to the rear side of the first main body 11 (FIG. 3 and FIG. 4 show only the first engaging unit 111 on the right side). Each first engaging unit 111 has a first engaging space 1110 and a projecting portion 1111, wherein the first engaging space 1110 can be concavely formed on the surface of the first main body 11, and the projecting portion 1111 can be protrudingly provided on the first main body 11 at a position corresponding to the first engaging space 1110 such that the projecting portion 1111 is located in the first engaging space 1110.

With continued reference to FIG. 3 and FIG. 4, the second main body 12 is provided with two second engaging units 121 corresponding respectively in position to the first engaging units 111. Each second engaging unit 121 has a protruding block 1211 and a through hole 1210, wherein the protruding block 1211 extends from the front side of the second main body 12 and is formed with the through hole 1210. To assemble the first main body 11 with the second main body 12, the two protruding blocks 1211 can be respectively inserted into the first engaging spaces 1110 until the projecting portions 1111 are engaged in the through holes 1210 respectively, and by doing so, the second engaging units 121 securely engaged with, and thus fixed to, the first engaging units 111 respectively. In certain embodiments, the inner side of each protruding block 1211 can be formed with a groove instead of the through hole 1210 to equally achieve the engaging effect described above. Furthermore, the structures of each first engaging unit 111 and of each second engaging unit 121 are not limited to those depicted in FIG. 3. The number, positions, and coupling manners of those structures can be adjusted according to practical needs, as long as such first engaging units 111 and/or second engaging units 121 allow the first main body 11 and the second main body 12 to be assembled with each other to form the carrying portion 1.

With continued reference to FIG. 3 and FIG. 4, the metallic sensing portion 2 can be made of an electrically conductive material (e.g., a copper-nickel-zinc alloy). In certain embodiments, the metallic sensing portion 2 can be inserted downward into and through the cavity 110. As a result, a portion of the metallic sensing portion 2 is received in the cavity 110, the top end of the metallic sensing portion 2 is exposed from the top side of the first main body 11, and the bottom end of the metallic sensing portion 2 is exposed from the bottom side of the first main body 11 so as to be connected with a circuit first electrode polarity (e.g., positive polarity), wherein the circuit can be provided on a circuit board or implemented as a wire. The metallic sensing portion 2 can be shaped as a post, with the top end bent toward the metallic air plate portion 3 (as shown in FIG. 1). However, the present disclosure is not limited thereto.

With continued reference to FIG. 3 and FIG. 4, at least a portion of the metallic air plate portion 3 can be clamped by and located between the first main body 11 and the second main body 12 and can be made of an electrically conductive material (e.g., a copper-nickel-zinc alloy). In certain embodiments, the metallic air plate portion 3 includes a deformation unit 31 and an airflow engaging unit 32. In certain embodiments, the deformation unit 31 can be a thin plate, is elastic, can be bent (i.e., deformed) when subjected to an external force, and can return to its original shape by its own restoring force when the external force is removed. The top end of the deformation unit 31 is connected with the airflow engaging unit 32, and the two lateral sides of the deformation unit 31 are each provided with an air-plate engaging unit 311 adjacent to the bottom end of the deformation unit 31. Each air-plate engaging unit 311 includes a plate 3111 and an aperture 3110, wherein the plate 3111 extends forward from one lateral side of the deformation unit 31 and is formed with the aperture 3110. To mount the metallic air plate portion 3 to the carrying portion 1, the plates 3111 can be respectively inserted into the first engaging spaces 1110 until the projecting portions 1111 extend through the apertures 3110 respectively to secure the metallic air plate portion 3 on the first main body 11. The protruding blocks 1211 can then be respectively inserted into the first engaging spaces 1110 and placed on the outer sides of the plates 3111 until the projecting portions 1111, which are now exposed through the apertures 3110 respectively, are engaged in the through holes 1210 respectively. Accordingly, the metallic air plate portion 3 can be securely positioned and fixed on the carrying portion 1, with the airflow engaging unit 32 and at least a portion of the deformation unit 31 exposed from, and lying above, the top side of the carrying portion 1, and with the bottom end or the deformation unit 31 exposed from, and lying below, the bottom side of the carrying portion 1. The bottom end of the metallic air plate portion 3 can be connected to a circuit of a second electrode polarity (e.g., negative polarity), wherein the circuit can be provided on a circuit board or implemented as a wire.

Figure 5:
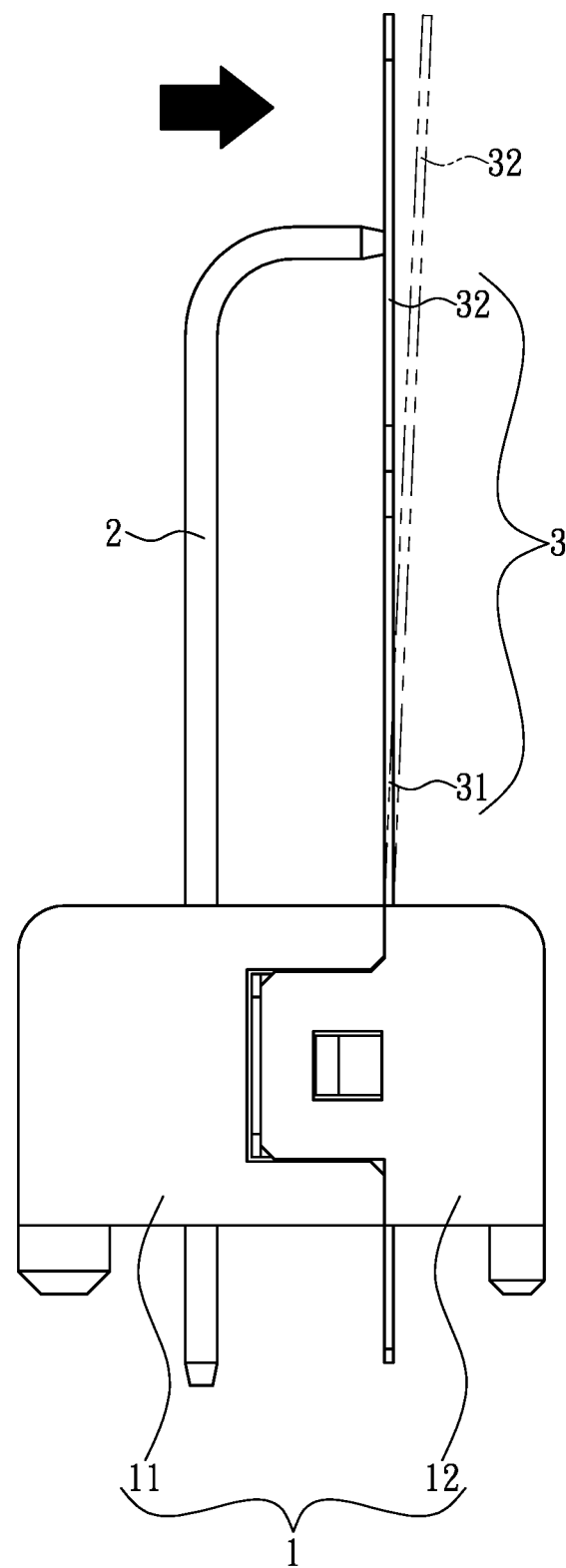
FIG. 5 is a side view showing a metallic sensing portion and a metallic air plate portion of the airflow detection device being in contact with each other according to certain embodiments of the present disclosure.

In certain embodiments, referring to FIG. 5, it is preset that when there is no airflow, the metallic sensing portion 2 and the metallic air plate portion 3 are in contact with each other and hence in a short-circuit state. When the airflow detection device S is mounted in an air output path with an airflow moving from the front side toward the rear side (as indicated by the arrow in FIG. 5, i.e., with the airflow moving from the left side of FIG. 5 toward the right side of FIG. 5), and under a condition that the current airflow volume to which the airflow engaging unit 32 is subjected in the air output path is greater than a threshold value, that is, the force applied to the deformation unit 31 by the airflow engaging unit 32 subjected to the current airflow volume is greater than the restoring force of the deformation unit 31, the airflow engaging unit 32 is displaced outward (i.e., toward the rear side, as indicated by the dashed lines in FIG. 5) and brought out of contact with the metallic sensing portion 2, and the airflow detection device S enters an open-circuit state, with the airflow engaging unit 32 driving the deformation unit 31 to deform, or more specifically, to bend. Under a condition that the current airflow volume to which the airflow engaging unit 32 is subjected in the air output path is less than the threshold value, that is, the force applied to the deformation unit 31 by the airflow engaging unit 32 subjected to the current airflow volume is less than the restoring force of the deformation unit 31, the deformation unit 31 maintains or returns to its original position and thus displace the airflow engaging unit 32 inward (i.e., toward the front side) until the airflow engaging unit 32 contacts the metallic sensing portion 2 (as shown in FIG. 5) and thereby brings the airflow detection device S back to the short-circuit state. It is worth mentioning that in certain embodiments, the deformation unit 31 has a smaller width than the airflow engaging unit 32 in order to be better deformed. However, the present disclosure is not limited thereto. In certain embodiments, the deformation unit 31 can have the same width as the airflow engaging unit 32, as long as the deformation unit 31 can be driven and consequently deformed by the airflow engaging unit 32.

In light of the above, a manufacturer only has to detect the airflow that normally takes place in the air output path of the electronic equipment, and then manufacture the airflow detection device S according to the pressure caused by this airflow, and obstruction of the air output path can be known by determining whether the airflow detection device S is in the short-circuit state or the open-circuit state. In certain embodiments, for example, the airflow in the air output path should be able to render the airflow detection device S into the open-circuit state when the air output path or the dust screen provided therein is not obstructed, or is not seriously obstructed, by foreign matter. Therefore, if the system detects that the airflow detection device S is currently in the short-circuit state, it can be inferred that the airflow in the air output path has been reduced and does not conform to the expected normal airflow. The system can then issue an alerting message, thereby urging a maintenance worker to go to the electronic equipment and carry out inspection and the required maintenance work. Therefore, the convenience of maintenance is greatly enhanced, and the burden on maintenance workers is reduced.

Figure 6:
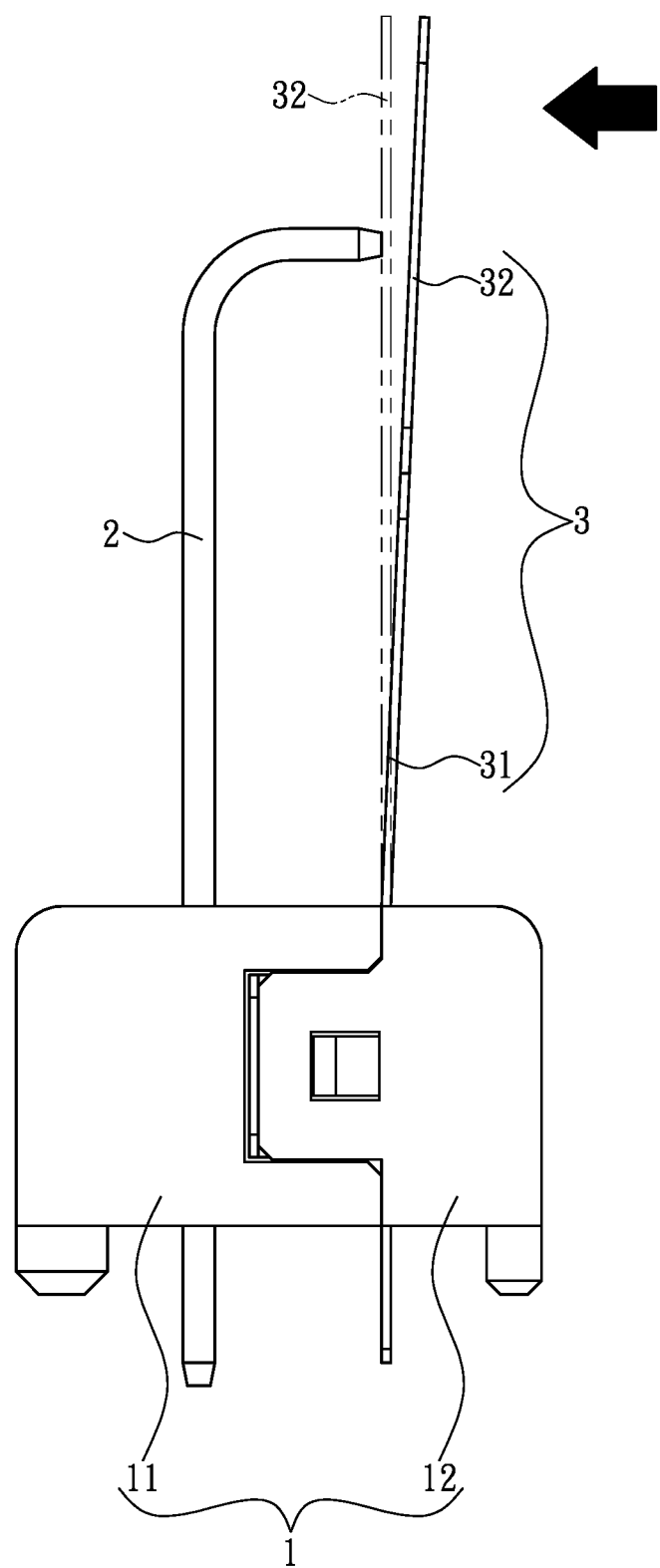
FIG. 6 is a side view showing the metallic sensing portion and the metallic air plate portion of the airflow detection device not being in contact with each other according to certain embodiments of the present disclosure.

Moreover, while in certain embodiments a first condition by which to determine the state of the airflow detection device S is the airflow volume in the air output path being less than a threshold value, that is, the current airflow volume to which the airflow engaging unit 32 is subjected in the air output path being less than a threshold value, and a second condition is the airflow volume in the air output path being greater than a threshold value, that is, the current airflow volume to which the airflow engaging unit 32 is subjected in the air output path being greater than the threshold value, the present disclosure is not limited thereto. In certain embodiments, referring to FIG. 6, it is preset that when there is no airflow, the metallic sensing portion 2 and the metallic air plate portion 3 are not in contact with each other, and are hence in an open-circuit state. When the airflow detection device S is mounted in an air output path with an airflow moving from the rear side toward the front side (as indicated by the arrow in FIG. 6, i.e., with the airflow moving from the right side of FIG. 6 toward the left side of FIG. 6), and under a condition that the current airflow volume to which the airflow engaging unit 32 is subjected in the air output path is greater than a threshold value, that is, the force applied to the deformation unit 31 by the airflow engaging unit 32 subjected to the current airflow volume is greater than the restoring force of the deformation unit 31, the airflow engaging unit 32 is displaced inward (i.e., toward the front side, as indicated by the dashed lines in FIG. 6) and thus brought into contact with the metallic sensing portion 2, and the airflow detection device S enters a short-circuit state, with the airflow engaging unit 32 driving the deformation unit 31 to deform, or more specifically, to bend. Under a condition that the current airflow volume to which the airflow engaging unit 32 is subjected in the air output path is less than the threshold value, that is, the force applied to the deformation unit 31 by the airflow engaging unit 32 subjected to the current airflow volume is less than the restoring force of the deformation unit 31, the deformation unit 31 maintains or returns to its original position and thus displace the airflow engaging unit 32 outward (i.e., toward the rear side), the airflow engaging unit 32, therefore, no longer contacts the metallic sensing portion 2 (as shown in FIG. 6), and the airflow detection device S re-enters the open-circuit state. It can be known from the above that a first condition by which to determine the state of the airflow detection device S can be that the current airflow volume in the air output path is greater than a threshold value, that is, the current airflow volume to which the airflow engaging unit 32 is subjected in the air output path being greater than a threshold value; and a second condition can be that the current airflow volume to the air output path is less than the threshold value that is, the current airflow volume to which the airflow engaging unit 32 is subjected in the air output path is less than the threshold value.

Figure 7:
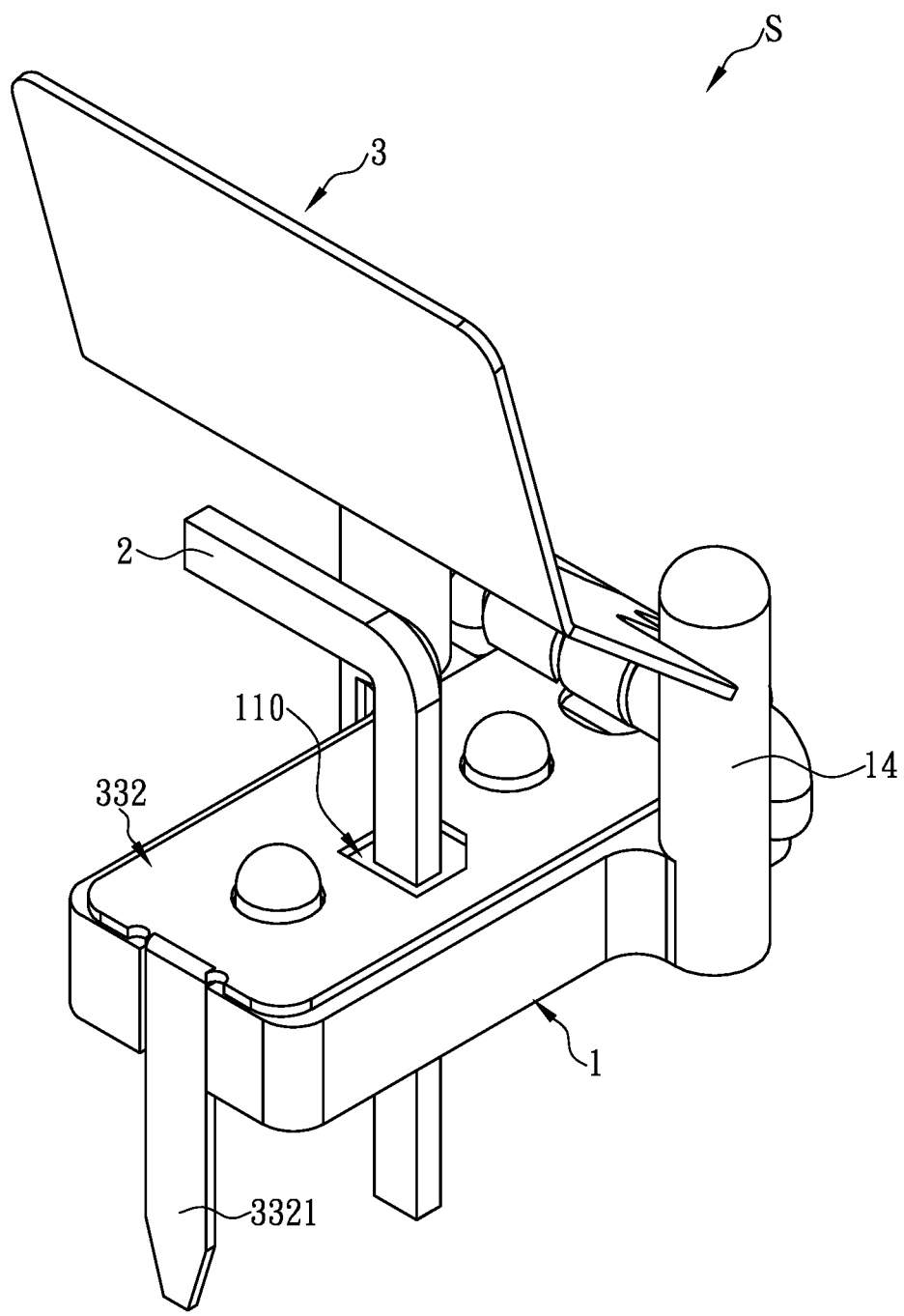
FIG. 7 is a perspective view of an airflow detection device according to certain embodiments of the present disclosure.
Figure 8:
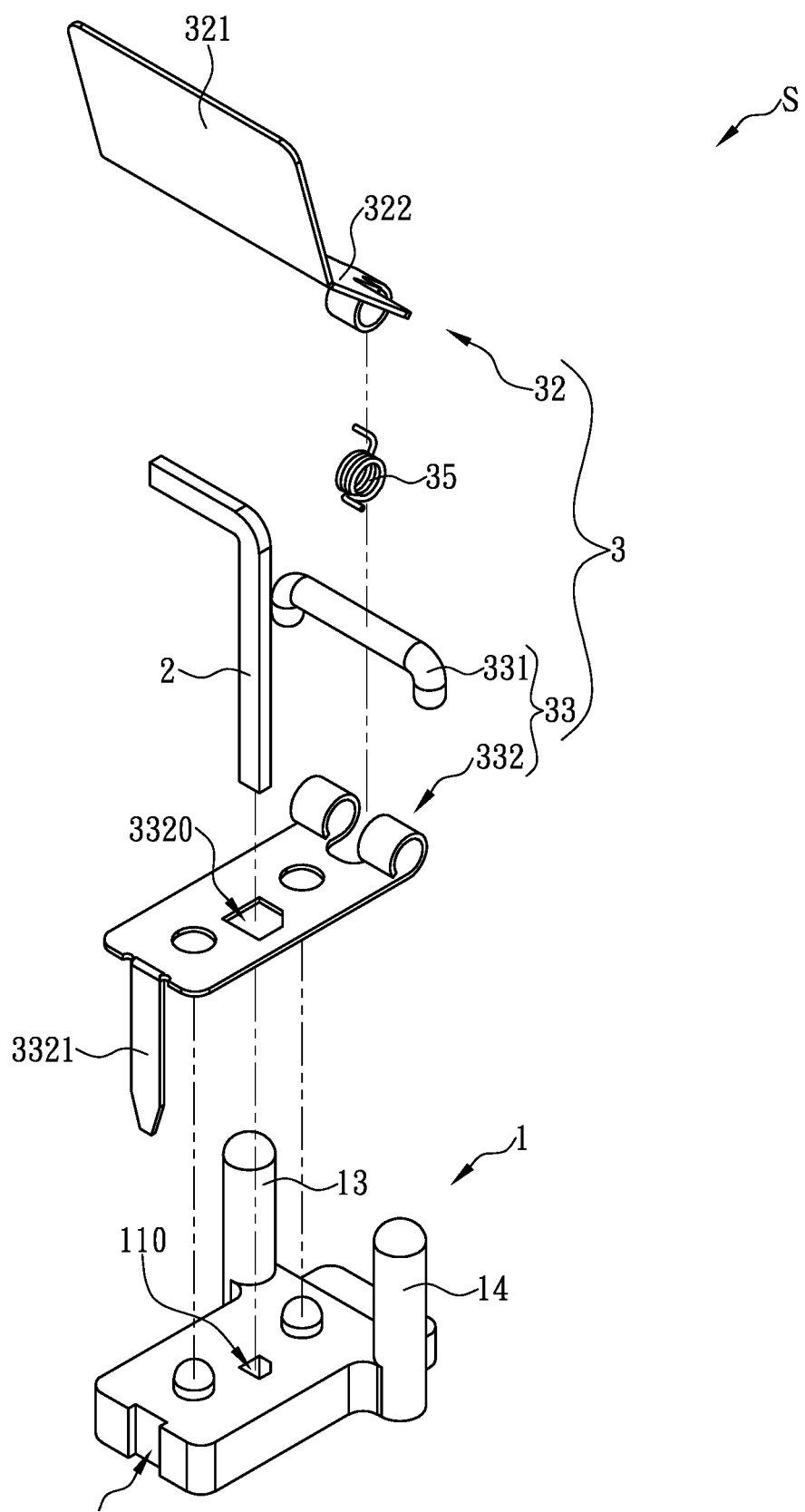
FIG. 8 is an exploded view of the airflow detection device according to certain embodiments of the present disclosure.

In certain embodiments, referring to FIG. 7 and FIG. 8, the airflow detection device S includes a carrying portion 1, a metallic sensing portion 2, and a metallic air plate portion 3. The carrying portion 1 can be made of a plastic material and has a central portion vertically penetrated by a cavity 110. The front side of the carrying portion 1 is concavely provided with a pin receiving space 10. The left and right lateral sides of the carrying portion 1 are respectively provided with a first positioning post 13 and a second positioning post 14, both of which extend upward and are adjacent to the rear side of the carrying portion 1. The metallic sensing portion 2 can be made of an electrically conductive material. In certain embodiments, the metallic sensing portion 2 can be inserted downward into and through the cavity 110. As a result, a portion of the metallic sensing portion 2 is received in the cavity 110, the top end of the metallic sensing portion 2 is exposed from the top side of the carrying portion 1, and the bottom end of the metallic sensing portion 2 is exposed from the bottom side of the carrying portion 1 so as to be connected with a circuit of a first electrode polarity (e.g., positive polarity), wherein the circuit can be provided on a circuit board or implemented as a wire. The metallic sensing portion 2 be shaped as a post, with the top end bent toward the left side of the carrying portion 1 (as shown in FIG. 7). However, the present disclosure is not limited thereto.

In certain embodiments, with continued reference to FIG. 7 and FIG. 8, the metallic air plate portion 3 includes an airflow engaging unit 32 and a base unit 33, each of which can be made of an electrically conductive material. The airflow engaging unit 32 can be located in front of the first and the second positioning posts 13, 14 and includes an airflow-engaging planar portion 321 and a pivotal connection planar portion 322. The airflow-engaging planar portion 321 can be in the upper half of the airflow engaging unit 32, and the pivotal connection planar portion 322 be in the lower half of the airflow engaging unit 32. In certain embodiments, to increase the airflow engaging area of the airflow engaging unit 32, the angle between the airflow-engaging planar portion 321 and the pivotal connection planar portion 322 can be less than 180 degrees and greater than or equal to the angle between the airflow-engaging planar portion 321 in a vertical position relative to the flowing direction of the airflow (i.e., the position in which the airflow-engaging planar portion 321 is perpendicular to the airflow) and the pivotal connection planar portion 322, so that all or most of the area of the front or rear side of the airflow-engaging planar portion 321 serves as an airflow engaging surface in the air output path. The height of the bottom edge of the pivotal connection planar portion 322 can be less than the height of the first positioning post 13 and of the second positioning post 14, and the width of the bottom edge of the pivotal connection planar portion 322 can be greater than the distance between the first positioning post 13 and the second positioning post 14, in order for the first positioning post 13 and the second positioning post 14 to limit the angle through which the airflow engaging unit 32 can be rotated rearward, thereby keeping the airflow engaging unit 32 in front of the two positioning posts 13 and 14 regardless of the rearward rotation of the airflow engaging unit 32.

With continued reference to FIG. 7 and FIG. 8, the base unit 33 includes a rotating shaft member 331 and a positioning member 332. The rotating shaft member 331 can be a horizontal bar, with its left and right ends bent downward. The rear side of the positioning member 332 can be curled upward and wound around the left and right ends of the rotating shaft member 331 to secure the rotating shaft member 331 at the positioning member 332 and position the rotating shaft member 331 to the rear of the first positioning post 13 and the second positioning post 14. The bottom side of the positioning member 332 can lie on the top side of the carrying portion 1. The front end of the positioning member 332 is provided with an air plate pin 3321, and a portion of the air plate pin 3321 can lie against the wall of the pin receiving space 10. The rear side of the positioning member 332 can be connected with the rotating shaft member 331. The pivotal connection planar portion 322 can be pivotally arranged on the rotating shaft member 331 and be pivotally connected to the carrying portion 1 indirectly. The positioning member 332 is formed with an opening 3320. The opening 3320 corresponds to the cavity 110 and has a diameter greater than the post width of the metallic sensing portion 2 so that the metallic sensing portion 2 will not contact the periphery of the opening 3320 and therefore will not form a short circuit with the positioning member 332. In certain embodiments, the rotating shaft member 331 and the positioning member 332 are exemplarily independent components. However, the present disclosure is not limited thereto. In certain embodiments, the base unit 33 can be a single integrally termed component. The top end (e.g., the airflow engaging unit 32) of the metallic air plate portion 3 can be exposed on the top side of the carrying portion 1. The bottom end (e.g., the air plate pin 3321) of the metallic air plate portion 3 can be connected to a circuit of a second electrode polarity (e.g., negative polarity), wherein the circuit can be provided on a circuit board or implemented as a wire.

Figure 9:
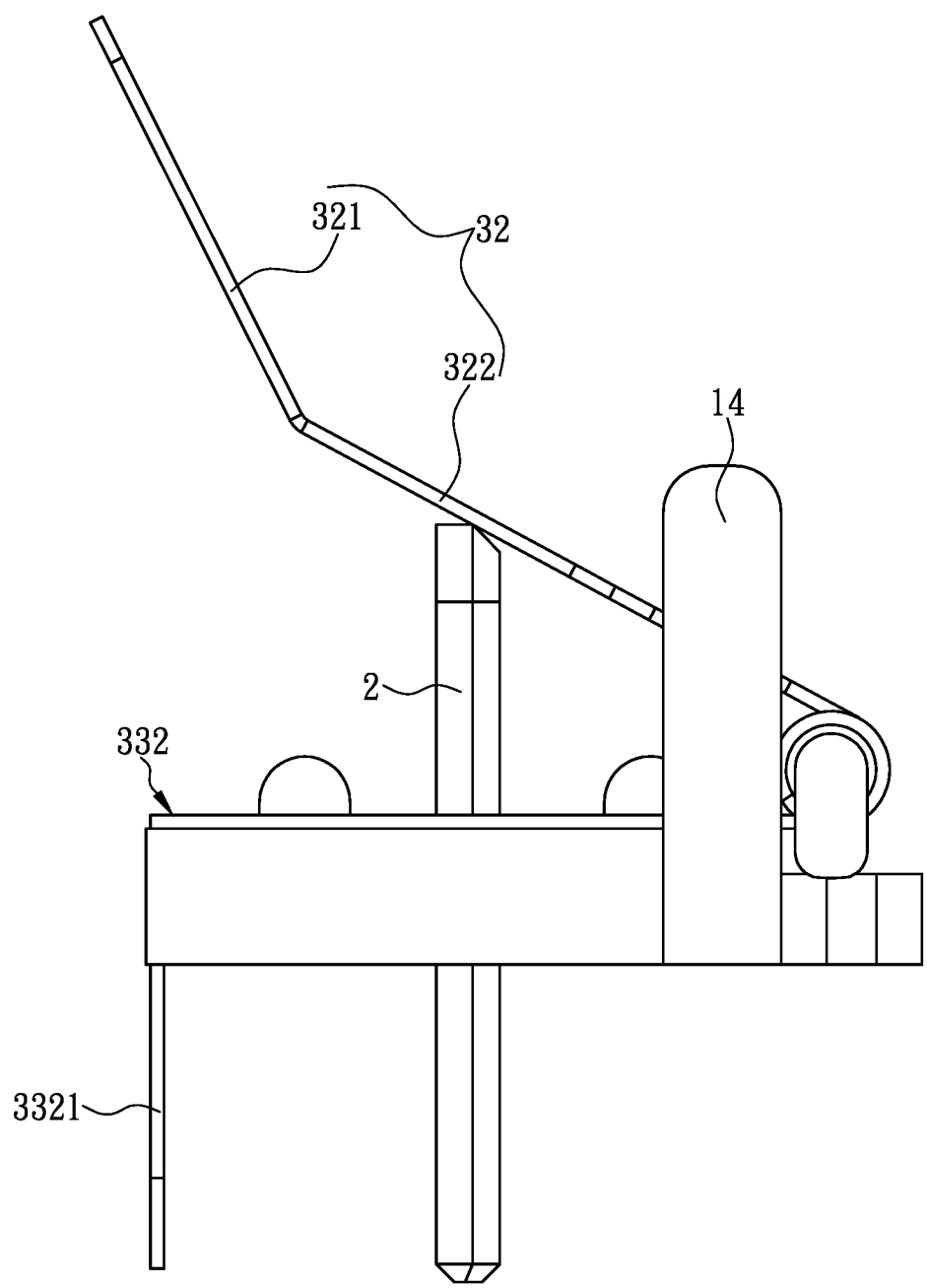
FIG. 9 is a side view showing a metallic sensing portion and a metallic air plate portion of the airflow detection device being in contact with each other according to certain embodiments of the present disclosure.

Referring to FIG. 7 and FIG. 9, in certain embodiments, it is preset that when there is no airflow, the metallic sensing portion 2 and the metallic air plate portion 3 are in contact with each other and hence in a short-circuit state. When the airflow detection device S is mounted in an air output path with an airflow moving from the front side toward the rear side (i.e., from the lower left corner of FIG. 7 toward the upper right corner of FIG. 7, or from the left side of FIG. 9 toward the right side of FIG. 9), and under a condition that the current airflow volume to which the airflow engaging unit 32 is subjected in the air output path is greater than a threshold value, that is, the upward force applied to the airflow engaging unit 32 by the current airflow volume is greater than the weight of, or the downward gravitational force acting on, the airflow engaging unit 32 itself, the airflow-engaging planar portion 321 responds to the airflow by driving the bottom side of the pivotal connection planar portion 322 into rearward rotation and by rotating rearward itself, the airflow engaging unit 32 is therefore brought out of contact with the metallic sensing portion 2 (as shown in FIG. 7), and the airflow detection device S enters an open-circuit state. Under a condition that the current airflow volume to which the airflow engaging unit 32 is subjected in the air output path is less than the threshold value, that is, the upward force applied to the airflow engaging unit 32 by the current airflow volume is less than the weight of, or the downward gravitational force acting on, the airflow engaging unit 32 itself, the airflow-engaging planar portion 321 drives the bottom side of the pivotal connection planar portion 322 into forward rotation while rotating forward (i.e., toward the metallic sensing portion 2) itself, the airflow engaging unit 32 stays in contact with or eventually contacts the metallic sensing portion 2 (as shown in FIG. 9), thereby maintaining or bringing back the airflow detection device S in or to the short-circuit state.

While a first condition by which to determine the state of the airflow detection device S can be that the airflow volume in the air output path is greater than a threshold value, that is, the current airflow volume to which the airflow engaging unit 32 is subjected in the air output path is greater than a threshold value, and the second condition can be that the airflow volume in the air output path is less than the threshold value, that is, the current airflow volume to which the airflow engaging unit 32 is subjected in the air output path is less than a threshold value, the present disclosure is not limited thereto. In certain embodiments, referring again to FIG. 7 to FIG. 9, the rear end of the airflow engaging unit 32 can be provided therein with a helical spring 35, and the helical spring 35 can apply an elastic force to the airflow engaging unit 32 such that when there is no airflow, the metallic sensing portion 2 and the metallic air plate portion 3 are not in contact with each other and are hence in an open-circuit state as the preset state. When the airflow detection device S is mounted in an air output path with an airflow moving from the rear side toward the front side (i.e., from the upper right corner of FIG. 7 toward the lower left corner of FIG. 7, or from the right side of FIG. 9 toward the left side of FIG. 9), and under a condition that the current airflow volume to which the airflow-engaging planar portion 321 is subjected in the air output path is less than a threshold value, that is, the elastic force applied to the airflow engaging unit 32 by the helical spring 35 is greater than the force applied to the airflow engaging unit 32 by the airflow-engaging planar portion 321 subjected to the current airflow volume, the airflow engaging unit 32 remain out of contact with the metallic sensing portion 2 (as shown in FIG. 7), thereby allowing the airflow detection device S to stay in the open-circuit state. Under a condition that the current airflow volume to which the airflow-engaging planar portion 321 is subjected in the air output path is greater than the threshold value, that is, the force applied to the airflow engaging unit 32 by the airflow-engaging planar portion 321 subjected to the current airflow volume is greater than the force applied to the airflow engaging unit 32 by the helical spring 35, the airflow engaging unit 32 is rotated toward the metallic sensing portion 2 until in contact with the metallic sensing portion 2 (as shown in FIG. 9), thereby bringing the airflow detection device S to a short-circuit state.

Figure 10:
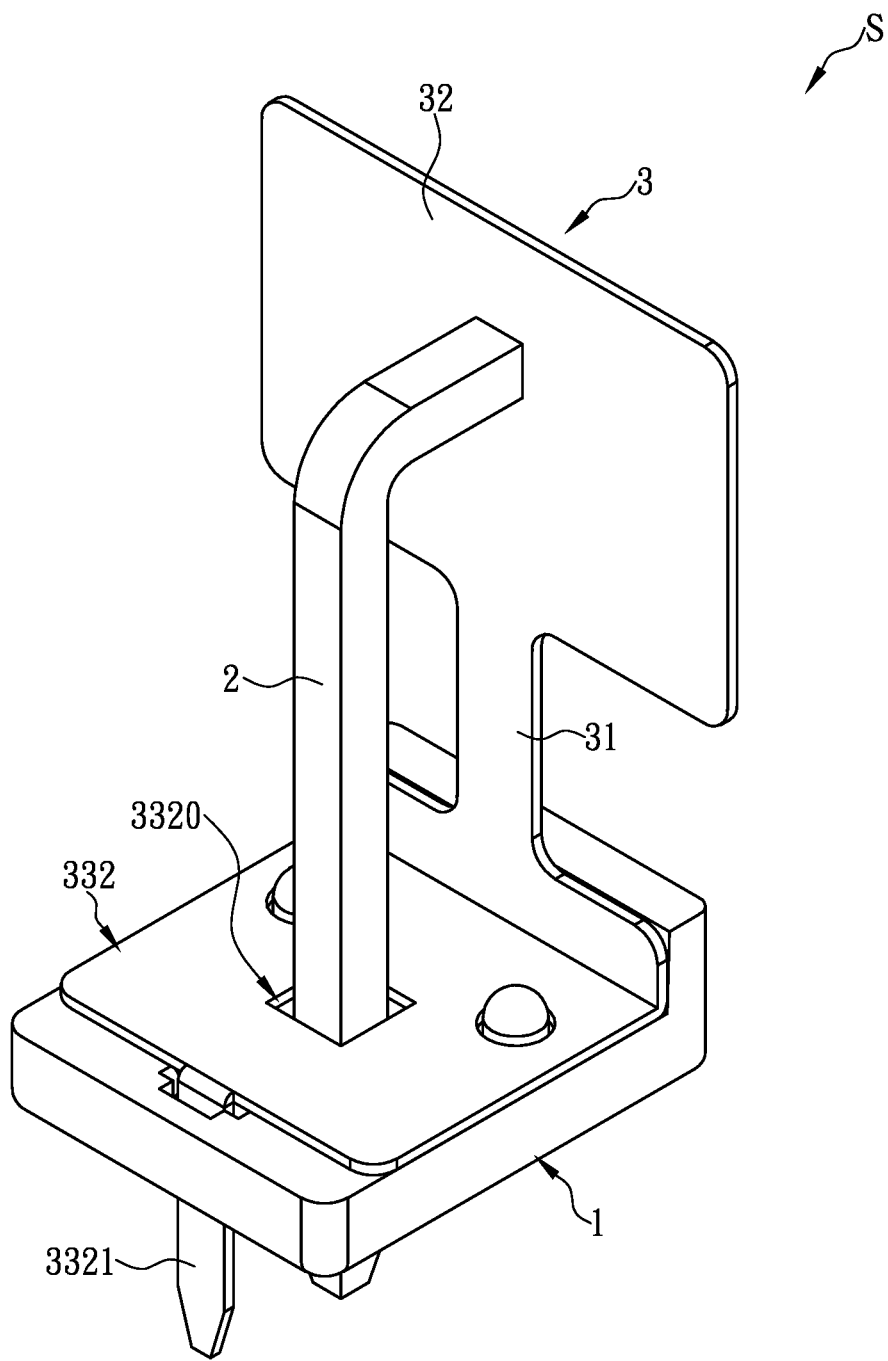
FIG. 10 is a perspective view of an airflow detection device according to certain embodiments of the present disclosure.
Figure 11:
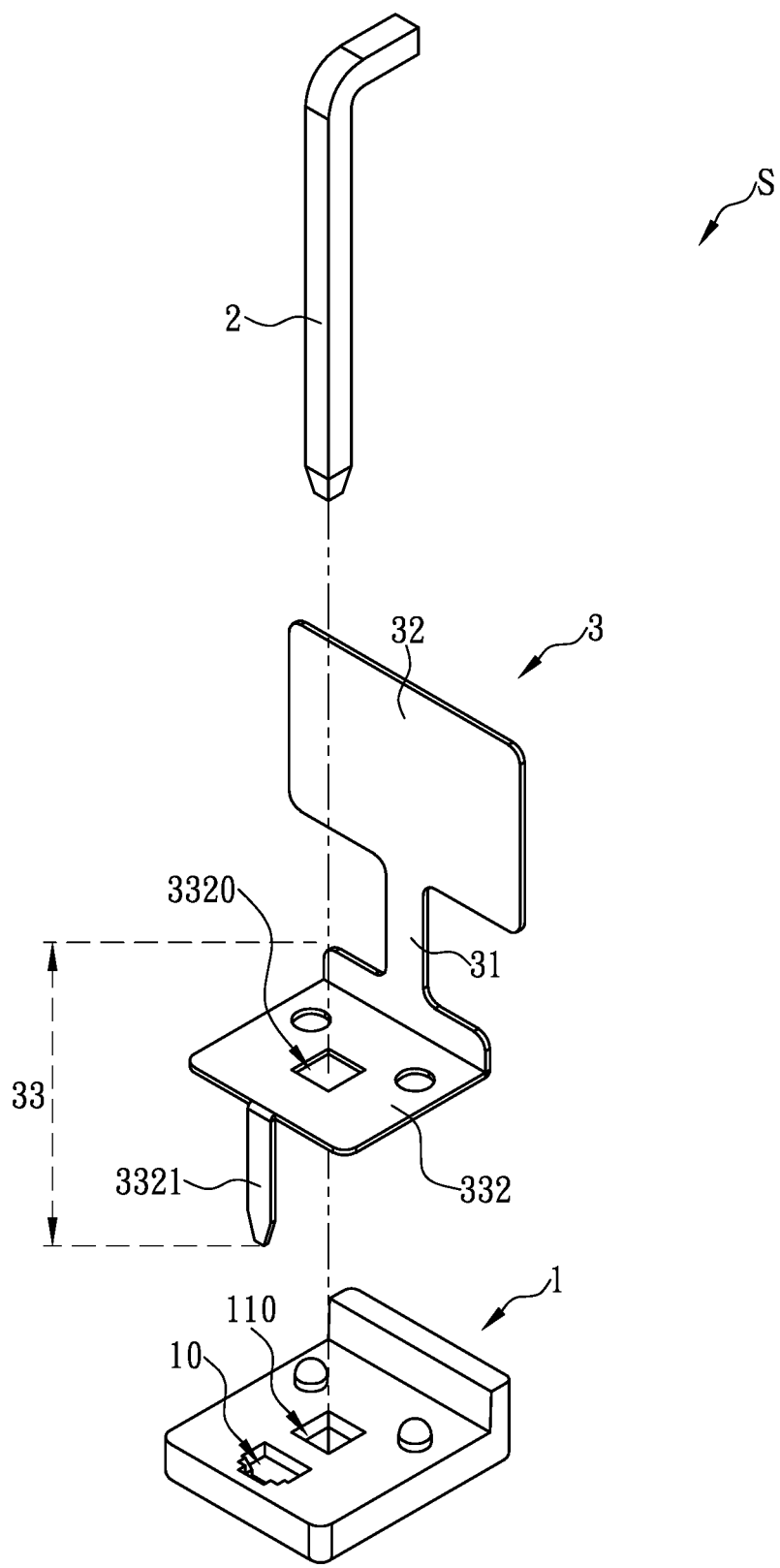
FIG. 11 is an exploded view of the airflow detection device according to certain embodiments of the present disclosure.

Referring to FIG. 10 and FIG. 11, in certain embodiments, the airflow detection device S includes a carrying portion 1, a metallic sensing portion 2, and a metallic air plate portion 3. The carrying portion 1 can be made of a plastic material and has a central portion vertically penetrated by a cavity 110. The top side of the carrying portion 1 is vertically penetrated by a pin receiving space 10 adjacent to the front end of the carrying portion 1. The carrying portion 1 can be L-shaped; however, the present disclosure is not limited thereto. The metallic sensing portion 2 can be made of an electrically conductive material. In certain embodiments, the metallic sensing portion 2 can be inserted downward into and through the cavity 110. As a result, a portion of the metallic sensing portion 2 can be received in the cavity 110, the top end of the metallic sensing portion 2 can be exposed from the top side of the carrying portion 1, and the bottom end of the metallic sensing portion 2 can be exposed from the bottom side of the carrying portion 1. The metallic sensing portion 2 can be shaped as a post, with the lop end bent along a direction toward the metallic air plate portion 3 (as shown in FIG. 10) when the metallic air plate portion 3 is assembled to the carrying portion 1. However, the present disclosure is not limited thereto.

With continued reference to FIG. 10 and FIG. 11, the metallic air plate portion 3 includes a deformation unit 31, an airflow engaging unit 32, and a positioning member 332, and can be made of an electrically conductive material. The deformation unit 31 can be a thin plate, is elastic, can be bent (i.e., deformed) when subjected to an external force, and can return to its original shape by its own restoring force when the external force is removed. The top end of the deformation unit 31 is provided with the airflow engaging unit 32. Both the deformation unit 31 and the airflow engaging unit 32 are exposed above the top side of the carrying portion 1. The bottom end of the deformation unit 31 adjoins the positioning member 332. The positioning member 332 is formed with an opening 3320. The opening 3320 corresponds to the cavity 110 and has a diameter greater than the post width of the metallic sensing portion 2 so that the metallic sensing portion 2 will not contact the periphery of the central area and therefore will not form a short circuit with the positioning member 332. The front end of the positioning member 332 is provided with an air plate pin 3321, and a portion of the air plate pin 3321 can lie against the wall of the pin receiving space 10, with the bottom end of the air plate pin 3321 exposed from the bottom side of the carrying portion 1. The positioning member 332 can be shaped as a legless and armless chair and is configured to lie compliantly against the top side of the carrying portion 1 and the front side of the rear end of the carrying portion 1. The bottom end of the metallic sensing portion 2 can be connected to a circuit of a first electrode polarity (e.g., positive polarity), wherein the circuit can be provided on a circuit board or implemented as a wire. The air plate pin 3321, on the other hand, can be connected to a circuit of a second electrode polarity (e.g., negative polarity), wherein the circuit can be provided on a circuit board or implemented as a wire.

With continued reference to FIG. 10, in certain embodiments, it is preset that when there is no airflow, the metallic sensing portion 2 and the metallic air plate portion 3 are in contact with each other and hence in a short-circuit state. When the airflow detection device S is mounted in an air output path with an airflow moving from the front side toward the rear side (i.e., from the lower left corner of FIG. 10 toward the upper right corner of FIG. 10), and under a condition that the current airflow volume to which the airflow engaging unit 32 is subjected in the air output path is greater than a threshold value, that is, the force applied to the deformation unit 31 by the airflow engaging unit 32 subjected to the current airflow volume is greater than the restoring force of the deformation unit 31, the airflow engaging unit 32 will be displaced outward (i.e., toward the rear side, or toward the upper right corner of FIG. 10) and thus brought out of contact with the metallic sensing portion 2, the airflow detection device S therefore enters an open-circuit state, with the airflow engaging unit 32 driving the deformation unit 31 to deform, or more specifically, to bend. Under a condition that the current airflow volume to which the airflow engaging unit 32 is subjected in the air output path is less than the threshold value, that is, the force applied to the deformation unit 31 by the airflow engaging unit 32 subjected to the current airflow volume is less than the restoring force of the deformation unit 31, the deformation unit 31 maintains or returns to its original position and can thus displace the airflow engaging unit 32 inward (i.e., toward the front side, or toward the lower left corner of FIG. 10) until the airflow engaging unit 32 contacts the metallic sensing portion 2 and thereby maintains or brings back the airflow detection device S in or to the short-circuit state. The relative positions of the metallic sensing portion 2 and the metallic air plate portion 3 can also be better understood with the aid of the side view shown in FIG. 5 as described supra.

While as first condition by which to determine the state of the airflow detection device S can be that the airflow volume in the air output path is less than a threshold value, that is, the current airflow volume to which the airflow engaging unit 32 is subjected in the air output path is less than a threshold value, and the second condition can be that the airflow volume in the air output path is greater than the threshold value, that is, the current airflow volume to which the airflow engaging unit 32 is subjected in the air output path is greater than a threshold value, the present disclosure is not limited thereto. In certain embodiments, in which the relative positions of the metallic sensing portion 2 and the metallic air plate portion 3 can also be better understood with the aid of the side view shown in FIG. 6 as described supra, it is preset that when there is no airflow, the metallic sensing portion 2 and the metallic air plate portion 3 are not in contact with each other, and are hence in an open-circuit state. When the airflow detection device S is mounted in an air output path with an airflow moving from the rear side toward the front side (i.e., from the upper right corner of FIG. 10 toward the lower left corner of FIG. 10), and under a condition that the current airflow volume to which the airflow engaging unit 32 is subjected in the air output path is greater than a threshold value, that is, the three applied to the deformation unit 31 by the airflow engaging unit 32 subjected to the current airflow volume is greater than the restoring force of the deformation unit 31, the airflow engaging unit 32 is displaced inward (i.e., toward the front side) and thus brought into contact with the metallic sensing portion 2, and the airflow detection device S therefore enters a short-circuit state, with the airflow engaging unit 32 driving the deformation unit 31 to deform, or more specifically, to bend. Under a condition that the current airflow volume to which the airflow engaging unit 32 is subjected in the air output path is less than the threshold value, that is, the force applied to the deformation unit 31 by the airflow engaging unit 32 subjected to the current airflow volume is less than the restoring force of the deformation unit 31, the deformation unit 31 maintains or returns to its original position and thus can displace the airflow engaging unit 32 outward (i.e., toward the rear side), the airflow engaging unit 32, therefore, maintains without contact with or no longer contacts the metallic sensing portion 2, and the airflow detection device S remains in or re-enters the open-circuit state. It can be known from the above that the first condition by which to determine the state of the airflow detection device S in certain embodiments can be that the airflow volume in the air output path is greater than a threshold value, that is, the current airflow volume to which the airflow engaging unit 32 is subjected in the air output path is greater than a threshold value; and the second condition can be that the airflow volume in the air output path is less than the threshold value, the current airflow volume to which the airflow engaging unit 32 is subjected in the air output path is less than a threshold value.

Figure 12:
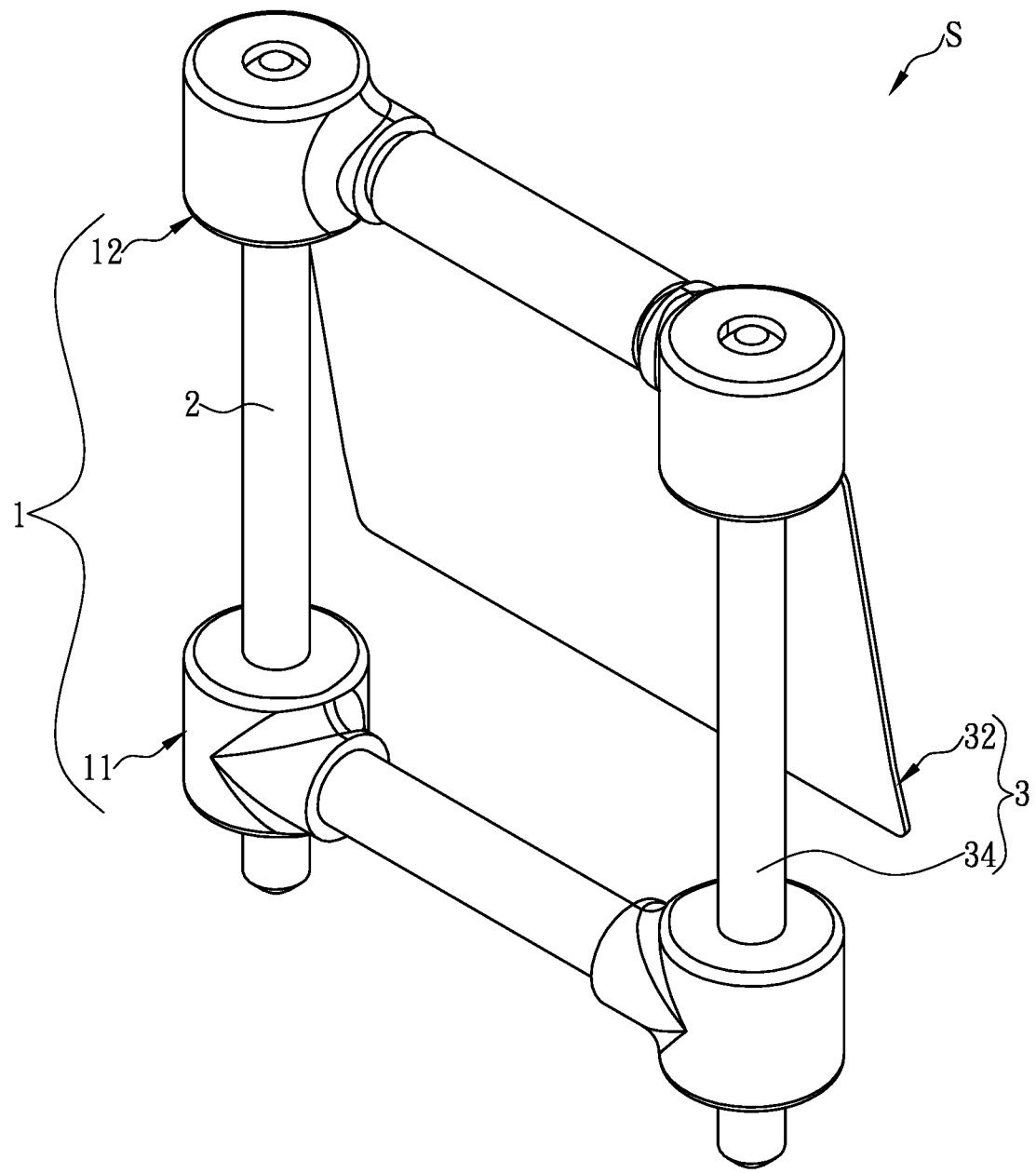
FIG. 12 is a perspective view of an airflow detection device according to certain embodiments of the present disclosure.
Figure 13:
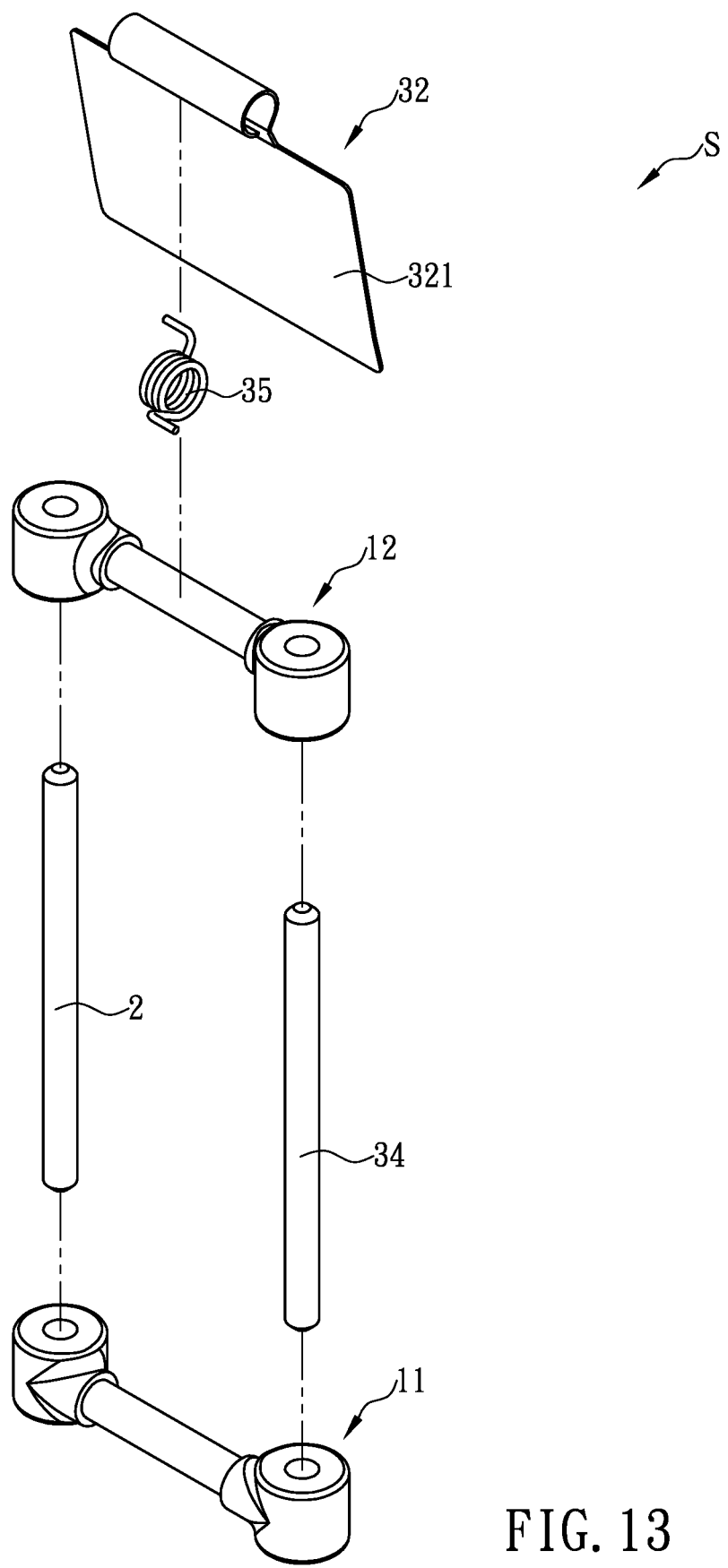
FIG. 13 is an exploded view of the airflow detection device according to certain embodiments of the present disclosure.

Referring to FIG. 12 and FIG. 13, in certain embodiments, the airflow detection device S includes a carrying portion 1, a metallic sensing portion 2, and a metallic air plate portion 3. The carrying portion 1 can be made of a plastic material and includes a first main body 11 and a second main body 12. The second main body 12 serves as a support on which the metallic air plate portion 3 can be swung forward and rearward. The first main body 11 can be parallel or substantially parallel to the second main body 12, and the first main body 11 and the second main body 12 can be formed as bars or a frame. However, the present disclosure is not limited thereto.

With continued reference to FIG. 12 and FIG. 13, each of the metallic sensing portion 2 and the metallic air plate portion 3 can be made of an electrically conductive material. The metallic air plate portion 3 includes an airflow engaging unit 32 and a contact unit 34. The airflow engaging unit 32 and the contact unit 34 can be independent components. The top end of the airflow engaging unit 32 can be pivotally connected to the second main body 12. A bottom portion of the contact unit 34 and a bottom portion of the metallic sensing portion 2 can be disposed at two opposite sides of the first main body 11 respectively and penetrate the first main body 11. A top portion of the contact unit 34 and a top portion of the metallic sensing portion 2 can be disposed at two opposite sides of the second main body 12 respectively. The airflow engaging unit 32 can be pivotally connected to the second main body 12, and includes airflow-engaging planar portion 321. The airflow-engaging planar portion 321 can be located on the outer side of the first and the second main bodies 11 and 12 and can be swung to variable degrees by the force applied to the airflow engaging unit 32 by an airflow. The width of the airflow-engaging planar portion 321 can be greater than the distance between the contact unit 34 and the metallic sensing portion 2. The metallic sensing portion 2 can be connected to a circuit of a first electrode polarity (e.g., positive polarity), wherein the circuit can be provided on a circuit board or implemented as a wire. The contact unit 34 can be connected to a circuit of a second electrode polarity (e.g., negative polarity), wherein the circuit can be provided on a circuit board or implemented as a wire. The bottom side of the metallic sensing portion 2 and the bottom side of the contact unit 34 can be fixed on an assembled printed circuit board assembly (PCBA) in order for the PCBA to support the airflow detection device S. The metallic sensing portion 2 and the contact unit 34 can be shaped as posts but are not necessarily so configured.

Figure 14:
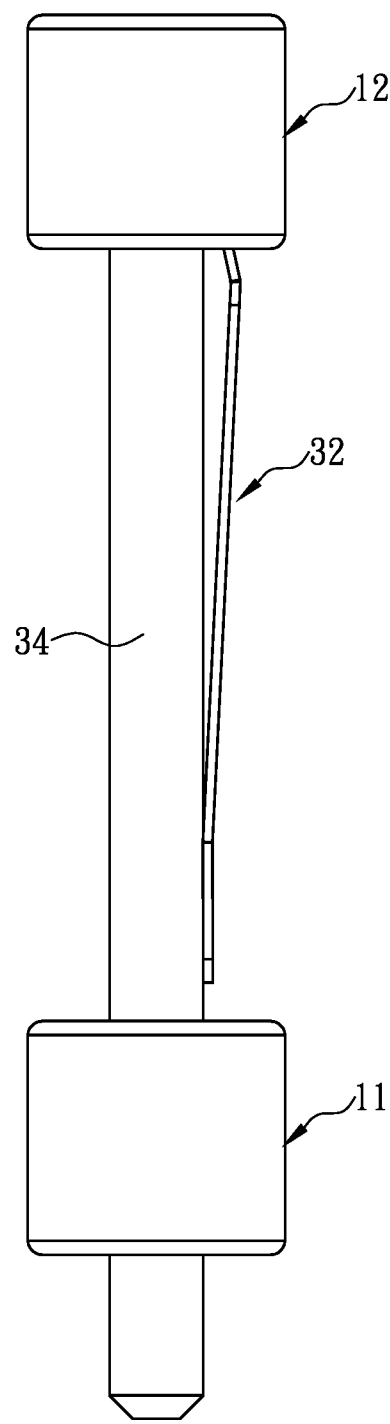
FIG. 14 is a side view showing a metallic sensing portion and a metallic air plate portion of the airflow detection device being in contact with each other according to certain embodiments of the present disclosure.

Referring to FIG. 12 and FIG. 14, in certain embodiments, it is preset that when there is no airflow, the airflow engaging unit 32 is in contact with both the metallic sensing portion 2 and the contact unit 34 (which is equivalent to the metallic air plate portion 3 in contact with the metallic sensing portion 2, as shown in FIG. 14). In other words, it is preset that the airflow engaging unit 32, the metallic sensing portion 2, and the contact unit 34 are in a short-circuit state when there is no airflow. When the airflow detection device S is mounted in an air output path with an airflow moving from the front side in FIG. 12 and FIG. 14 toward the rear side in FIG. 12 and FIG. 14 (i.e., from the lower left corner of FIG. 12 toward the upper right corner of FIG. 12, or from the left side of FIG. 14 toward the right side of FIG. 14), and under a condition that the current airflow volume to which the airflow-engaging planar portion 321 is subjected in the air output path is greater than a threshold value, that is, the force applied to the airflow engaging unit 32 by the airflow-engaging planar portion 321 subjected to the current airflow volume is greater than the weight of, or the downward gravitational force acting on, the airflow engaging unit 32 itself, the airflow engaging unit 32 is displaced outward (i.e., toward the rear side) and thus brought out of contact with the metallic sensing portion 2 (as shown in FIG. 12), and the airflow detection device S enters an open-circuit state. Under a condition that the current airflow volume to which the airflow-engaging planar portion 321 is subjected in the air output path is less than the threshold value, that is, the force applied to the airflow-engaging planar portion 321 by the current airflow volume is less than the weight of, or the downward gravitational three acting on, the airflow engaging unit 32 itself, the airflow engaging unit 32 remains its original position and contact with or is displaced inward (i.e., toward the front side) until in contact with the metallic sensing portion 2 (as shown in FIG. 14) and thus maintaining or bringing back the airflow detection device S in or to the short-circuit state.

While a first condition by which to determine the state of the airflow detection device S can be that the airflow volume in the air output path is less than a threshold value, that is, the current airflow volume to which the airflow-engaging planar portion 321 is subjected in the air output path is less than a threshold value, and a second condition can be that the airflow volume in the air output path is greater than the threshold value, that is, the current airflow volume to which the airflow-engaging planar portion 321 is subjected in the air output path is greater than a threshold value, the present disclosure is not limited thereto. In certain embodiments, referring again to FIG. 12 to FIG. 14, the top end of the airflow engaging unit 32 is provided therein with a helical spring 35, and the helical spring 35 applies an elastic force to the airflow engaging unit 32 such that when there is no airflow, the metallic sensing portion 2, the airflow engaging unit 32, and the contact unit 34 are not in contact with one another and are hence in an open-circuit state as the preset state. When the airflow detection device S is mounted in an air output path with an airflow moving from the rear side in FIG. 12 and FIG. 14 toward the front side in FIG. 12 and FIG. 14 (i.e., from the upper right corner of FIG. 12 toward the lower left corner of FIG. 12, or from the right side of FIG. 14 toward the left side of FIG. 14), and under a condition that the current airflow volume to which airflow-engaging planar portion 321 is subjected in the air output path is greater than a threshold value, that is, the force applied to the airflow engaging unit 32 by the airflow-engaging planar portion 321 subjected to the current airflow volume is greater than the elastic force of the helical spring 35, the airflow engaging unit 32 is displaced inward (i.e, toward the front side) and thus brought into contact with the metallic sensing portion 2 and the contact unit 34 (as shown in FIG. 14), and the airflow detection device S therefore enters a short-circuit state. Under a condition that the current airflow volume to which airflow-engaging planar portion 321 is subjected in the air output path is less than the threshold value, that is, the force applied to the airflow engaging unit 32 by the airflow-engaging planar portion 321 subjected to the current airflow volume is less than the elastic force of the helical spring 35, the airflow engaging unit 32 remains or is displaced outward (i.e., toward the rear side) and thus remaining or brought out of contact with the metallic sensing portion 2 (as shown in FIG. 12) such that the airflow detection device S remains in or re-enters the open-circuit state. It can be known from the above that the first condition by which to determine the state of the airflow detection device S can be that the airflow volume in the air output path is greater than a threshold value, that is, the current airflow volume to which the airflow-engaging planar portion 321 is subjected in the air output path is greater than a threshold value; and the second condition can be that the airflow volume in the air output path is less than the threshold value that is, the current airflow volume to which the airflow-engaging planar portion 321 is subjected in the air output path is less than a threshold value.

It is noted that the carrying portion 1, the metallic sensing portion 2, and the metallic air plate portion 3 according to the present disclosure can be implemented in various ways to meet product requirements. For example, the metallic sensing portion 2 and the metallic air plate portion 3 can be provided on separate independent components respectively (as exemplarily shown in FIG. 1) or on the same independent component (as exemplarily shown in FIG. 7). Moreover, the carrying portion 1 can have various configurations, such as a PCBA, a chip, or the housing of a machine, and as long as such a configuration can carry the metallic sensing portion 2 and the metallic air plate portion 3 and allow the metallic sensing portion 2 and the metallic air plate portion 3 to enter a short-circuit state and an open-circuit state, the configuration falls within the scope of the carrying portion 1 defined in the present disclosure.

Accordingly, the airflow detection device S according to the present disclosure can be used to detect whether the dust screen or ventilation holes in the air output path of a system fan is obstructed or has reduced heat dissipation capacity due to buildup of dust or dirt, can be applied to products located in remote areas, mountain areas, or other places where maintenance workers cannot inspect the products frequently for the dirtiness of their dust screens or the state of their ventilation holes, and can help warn of conditions such as ventilation holes being obstructed, so as to avoid the products from becoming overheated during operation due to dust/dirt-accumulated dust screens or obstructed ventilation holes, and any ensuing adversely affected product performances, service lives or stability, or even a system crash.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An airflow detection device configured to detect obstruction in an air output path of an electrical device and be mounted in the air output path of the electrical device, comprising:
    a carrying portion;
    a metallic sensing portion having a first electrode polarity and configured to be positioned on the carrying portion; and
    a metallic air plate portion having a second electrode polarity and configured to be positioned on the carrying portion, in response to an airflow volume in the air output path meeting a first condition, contact the metallic sensing portion to enter a short-circuit state, and in response to the airflow volume in the air output path meeting a second condition, not contact the metallic sensing portion to enter an open-circuit state,
    wherein the carrying portion has a cavity, a portion of the metallic sensing portion is configured to be received in the cavity, a top end of the metallic sensing portion is configured to be exposed from a top side of the carrying portion, and the carrying portion comprises:
        a first main body formed with the cavity and provided with a first engaging unit, wherein the top end of the metallic sensing portion is configured to be exposed from the first main body; and
        a second main body provided with a second engaging unit configured to engage with the first engaging unit, wherein a portion of the metallic air plate portion is configured to be clamped by and located between the first main body and the second main body.

2. The airflow detection device according to claim 1, wherein the first condition is the airflow volume being greater than a threshold value, and the second condition is the airflow volume being smaller than the threshold value.

3. The airflow detection device according to claim 2, wherein the metallic air plate portion includes a deformation unit and an airflow engaging unit connected with the deformation unit and configured to apply a force to the deformation unit when being subjected to the airflow volume.

4. The airflow detection device according to claim 1, wherein the first condition is the airflow volume being smaller than a threshold value, and the second condition is the airflow volume being greater than the threshold value.

5. The airflow detection device according to claim 4, wherein the metallic air plate portion includes a deformation unit and an airflow engaging unit connected with the deformation unit and configured to apply a force to the deformation unit when being subjected to the airflow volume.

6. The airflow detection device according to claim 1, wherein the metallic air plate portion has an air-plate engaging unit configured to be engaged with the first engaging unit, and fix the metallic air plate portion to the first main body with a top end of the metallic air plate portion exposed from the first main body, and the second engaging unit is configured to be engaged with the first engaging unit and the air-plate engaging unit so that the metallic air plate portion is clamped between the first main body and the second main body.

7. The airflow detection device according to claim 1, wherein the metallic air plate portion includes a deformation unit and an airflow engaging unit connected with the deformation unit and configured to apply a force to the deformation unit when being subjected to the airflow volume.

8. An airflow detection device configured to detect obstruction in an air output path of an electrical device and be mounted in the air output path of the electrical device, comprising:
  a carrying portion;
  a metallic sensing portion having a first electrode polarity and configured to be positioned on the carrying portion; and
  a metallic air plate portion having a second electrode polarity and configured to be positioned on the carrying portion, in response to an airflow volume in the air output path meeting a first condition, contact the metallic sensing portion to enter a short-circuit state, and in response to the airflow volume in the air output path meeting a second condition, not contact the metallic sensing portion to enter an open-circuit state,
  wherein the metallic air plate portion includes a base unit and an airflow engaging unit connected with the base unit and configured to be pivotally connected to the carrying portion directly or indirectly and rotate in response to the airflow engaging unit being subjected to the airflow volume meeting the first condition or the second condition.

9. The airflow detection device according to claim 8, wherein the base unit includes a rotating shaft member and a positioning member having a bottom side configured to lie compliantly against a top side of the carrying portion, a front end provided with an air plate pin, and a rear side configured to be connected with the rotating shaft member, wherein the airflow engaging unit is pivotally arranged on the rotating shaft member to be pivotally connected to the carrying portion indirectly.

10. The airflow detection device according to claim 8, wherein the first condition is the airflow volume being greater than a threshold value, and the second condition is the airflow volume being smaller than the threshold value.

11. The airflow detection device according to claim 10, wherein the base unit includes a rotating shaft member and a positioning member having a bottom side configured to lie compliantly against a top side of the carrying portion, a front end provided with an air plate pin, and a rear side configured to be connected with the rotating shaft member, wherein the airflow engaging unit is pivotally arranged on the rotating shaft member to be pivotally connected to the carrying portion indirectly.

12. The airflow detection device according to claim 8, wherein the first condition is the airflow volume being smaller than a threshold value, and the second condition is the airflow volume being greater than the threshold value.

13. The airflow detection device according to claim 12, wherein the base unit includes a rotating shaft member and a positioning member having a bottom side configured to lie compliantly against a top side of the carrying portion, a front end provided with an air plate pin, and a rear side configured to be connected with the rotating shaft member, wherein the airflow engaging unit is pivotally arranged on the rotating shaft member to be pivotally connected to the carrying portion indirectly.

14. An airflow detection device configured to detect obstruction in an air output path of an electrical device and be mounted in the air output path of the electrical device, comprising:
  a carrying portion;
  a metallic sensing portion having a first electrode polarity and configured to be positioned on the carrying portion; and
  a metallic air plate portion having a second electrode polarity and configured to be positioned on the carrying portion, in response to an airflow volume in the air output path meeting a first condition, contact the metallic sensing portion to enter a short-circuit state, and in response to the airflow volume in the air output path meeting a second condition, not contact the metallic sensing portion to enter an open-circuit state,
  wherein the carrying portion comprises a first main body and a second main body, the metallic air plate portion includes an airflow engaging unit and a contact unit, a bottom portion of the contact unit and a bottom portion of the metallic sensing portion are configured to be disposed at two opposite sides of the first main body respectively, a top portion of the contact unit and a top portion of the metallic sensing portion are configured to be disposed at two opposite sides of the second main body respectively, the airflow engaging unit is configured to be pivotally connected to the second main body, and a width of the airflow engaging unit is greater than a distance between the contact unit and the metallic sensing portion.

15. The airflow detection device according to claim 14, wherein the first condition is the airflow volume being greater than a threshold value, and the second condition is the airflow volume being smaller than the threshold value.

16. The airflow detection device according to claim 14, wherein the first condition is the airflow volume being smaller than a threshold value, and the second condition is the airflow volume being greater than the threshold value.

* * * * *